United States Patent [19]

Harrick

[11] Patent Number: 4,716,293
[45] Date of Patent: Dec. 29, 1987

[54] ACCESSORY FOR INFRARED EMISSION SPECTROSCOPY

[76] Inventor: Nicolas J. Harrick, Croton Dam Rd., Ossining, N.Y. 10562

[21] Appl. No.: 863,732

[22] Filed: May 16, 1986

[51] Int. Cl.$^4$ .................. G01N 21/62; G01J 3/443
[52] U.S. Cl. .................. 250/340; 250/339; 250/353; 356/310; 356/311
[58] Field of Search ............ 250/353, 342, 341, 340, 250/339; 356/311, 310, 307

[56] References Cited

U.S. PATENT DOCUMENTS 4,009,962  3/1977  Lauer et al. .................. 356/346
4,594,509  6/1986  Simon et al. .................. 250/338

FOREIGN PATENT DOCUMENTS 0214241  10/1985  Japan .................. 250/353

OTHER PUBLICATIONS

M. Handke and N. J. Harrick, "A New Accessory for Infrared Emission Spectroscopy" *Applied Spectroscopy*, vol. 40, No. 3 (1986), pp. 401-405.

*Primary Examiner*—Janice A. Howell
*Assistant Examiner*—Constantine Hannaher

[57] ABSTRACT

An accessory for use with spectrophotometers for conducting IR emission spectra analyses of samples comprising a heated highly-reflecting surface for receiving the sample, an apertured reflecting mask located over the sample, and a curved reflector for collecting emissions from the sample via the aperture over a large solid angle to increase the signal-to-noise ratio.

15 Claims, 5 Drawing Figures

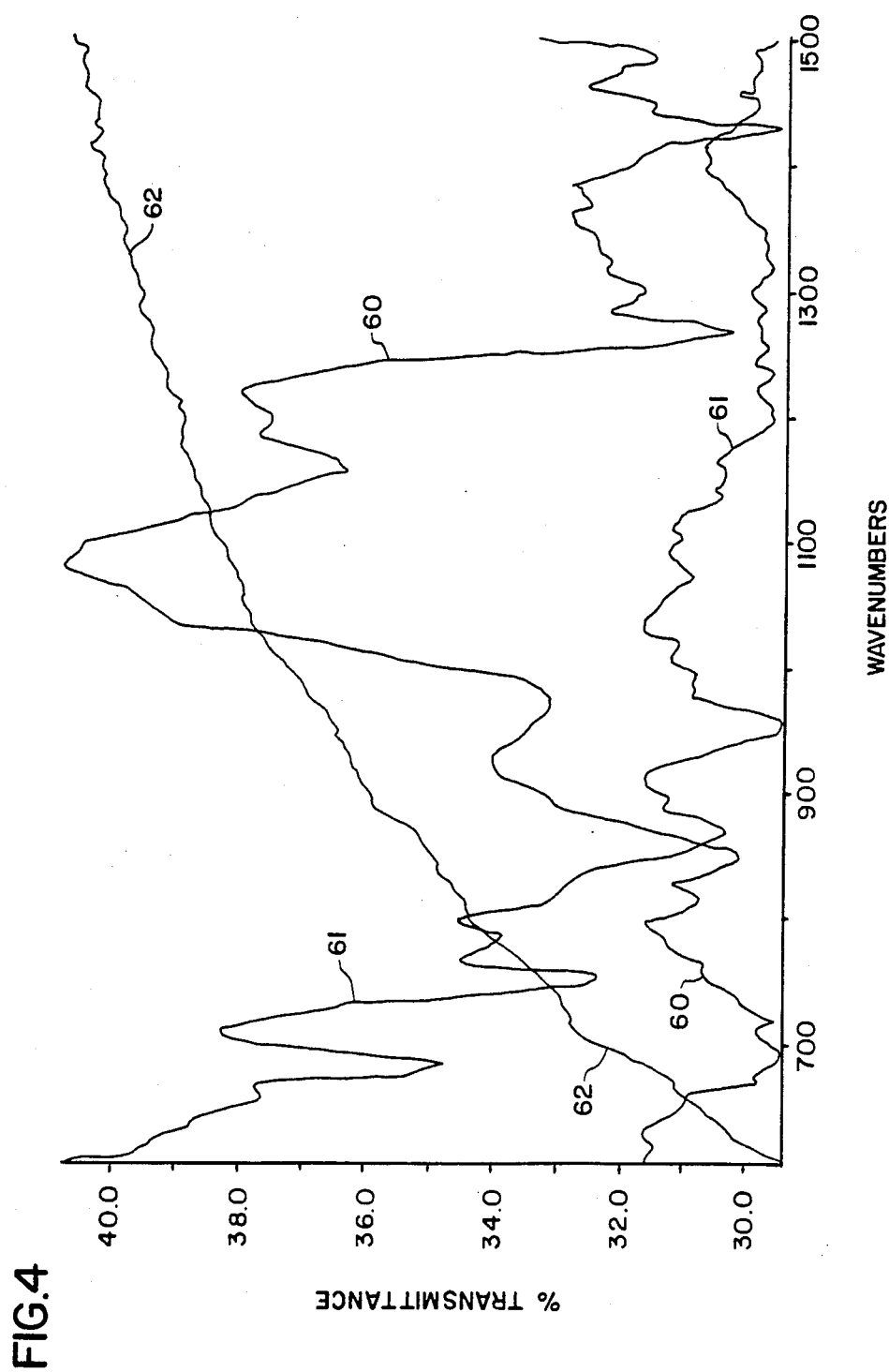

ACCESSORY FOR INFRARED EMISSION SPECTROSCOPY

This invention relates to infrared emission spectroscopy, and in particular to a novel accessory for use with spectrophotometers for measuring the emission spectra of samples.

BACKGROUND OF THE INVENTION

Fourier Transform Infrared Spectrometry (FT-IR), with its high sensitivity, allows the detection of weak infrared (IR) radiation emitted by samples. Published papers on emission spectrometry demonstrate that this technique is a powerful tool for studying vibration spectra of surface species, such as emission spectra measurements from metal surface species. For example, workers have observed the emission spectrum of oleic acid on aluminum foil; emission spectra of both thick and thin films of silicone grease on aluminum sheets have been measured; and the orientation of lubricant molecules in operating bearings and the formation of polymeric deposits from jet fuel on a heat exchanger surface have been studied.

The main problem in extending the emission technique to surface analysis is the strong background emission which is superimposed on a weak emission from the surface. The resultant low signal-to-noise ratio (S/N) is one reason why the great potential of emission IR spectrometry has not yet been fully exploited. Various methods have been suggested to overcome this problem. One approach is to reduce the background by cooling the spectrometer and sample chamber in liquid nitrogen. This approach, though expensive and cumbersome, has worked well and has provided sensitivities down to fractions of a monolayer of organic adsorbates on metal surfaces. Another approach tried to remove most of the background is by polarization-modulation, making use of the orientation of solid samples and, therefore, the polarization of their emitted IR radiation. This technique has its disadvantages due to the very small signal intensity. Still another way suggested to increase the S/N is by increasing the collected radiation. For instance, calculations have been made of the angular distribution of the intensity of the emission from species adsorbed on metal surfaces. These calculations indicate that the coherent emission from the oscillator dipole normal to a metal surface has an intensity maximum when the viewing angle is between 70 and 80 degrees from the normal, and is approximately zero in the direction normal to the surface. This is because the dipoles are oriented perpendicular to the surface and results from, it was suggested, the destructive interference between the emitted and reflected light from the interface to the metal surface. Using a viewing angle of 70 degrees, good quality measurements have been made of the emission spectra species from metal surfaces. Measurements have also been reported combining the large viewing angle with the polarization modulation technique for aluminum oxide on aluminum spectra measurements.

The techniques described above are complicated and require expensive equipment. To my knowledge, no one in the field has devised an accessory which is sufficiently adaptable to be employed in most standard spectrometers to enable a user to reflect radiation from an IR radiating sample into the spectrometer. Nor, to my knowledge, has anyone provided a configuration that can collect much of the radiant flux or will provide spatial resolution for neighboring source elements.

BRIEF DESCRIPTION OF THE INVENTION

A principal object of the invention is an IR emission accessory that can be employed with many conventional spectrometers.

A further object of the invention is an IR emission accessory providing improved S/N.

Another object of the invention is an IR emission accessory facilitating sampling of small areas of the sample.

In accordance with my invention, these and other objects and advantages as will appear hereinafter are achieved with an accessory construction comprising the novel combination of a large ellipsoidal or parabaloidal or similarly configured mirror mounted such that the sample area to be analyzed is located at or near the short focus of this mirror, and placing of the sample itself on or adjacent a highly reflective surface. A further feature of the invention is the mounting of a mask having a highly reflective surface so as to extend completely between, except for an accessing aperture, the curved mirror and the sample. Excellent S/N is thereby obtained, which is believed due to the combination of the specially configured mirror which subtends a large solid angle and hence collects a large amount of the emitted IR radiation, and the highly reflecting surface surrounding the sample which substantially eliminates background emission. Ideally, the following Kirchoff equality is realized: $E+T+R=1$ (where E=emission, T=transmission, and R=reflectivity). In the accessory of my invention, by making the background reflectivity $(R)=1$, due to the high reflectance surface surrounding the sample, the background emission must equal zero ($E=0$). Then, only emission from the sample ($E \neq 0$) will be observed and though weak can be readily detected to produce excellent IR spectra of various sample materials without employing the more complicated techniques described in the prior art, such as cooling to low temperatures or polarization modulation.

DESCRIPTION OF DRAWINGS

A preferred embodiment of my invention will now be described in greater detail with reference to the annexed drawings, of which:

FIG. 4 shows a sample spectrum taken with the accessory of FIG. 2 in the spectrometer of FIG. 1 for comparison with spectra taken by other techniques.

DETAILED DESCRIPTION OF PREFERRED EMBODIMENT

Figure 1:
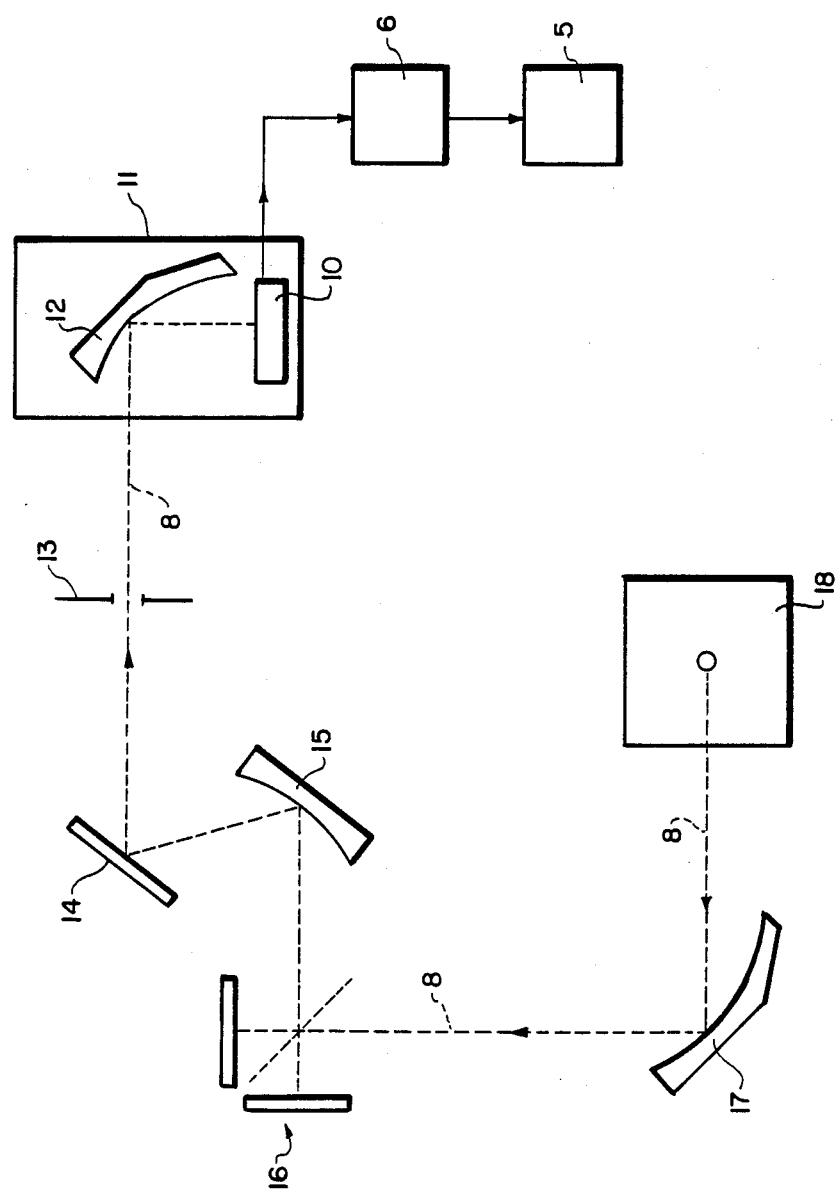
FIG. 1 is a schematic view of the optics of a conventional Mattson-Sirius 100 Spectrophotometer with the accessory of the invention, shown schematically, located in the sample chamber.

FIG. 1 shows, schematically, the optics of a Mattson-Sirius 100 Spectrometer, which is typical of high quality FT-IR spectrophotometers available to skilled persons in this art. Such instruments are typically used in a normal transmission mode, for which purpose an IR radiation source (not shown) is located inside a chamber 11 (behind a mirror shown at 12, whose purpose will be later explained). The radiation from the source, shown by the dashed lines 8, is passed through an iris 13, and after reflection from a plane mirror 14 and a paraboloidal mirror 15, passes through an interferometer 16 which in a known way disperses the beam in the spatial domain. This is then reflected off of a final paraboloidal reflector 17 and is then directed to a transmission sample located in the sample chamber shown by box 18. After passing through the sample, the beam (not shown) exits from the box 18 from its right side and enters the detector optics (also not shown). It will be observed that the optical path as described, shown by the dashed lines 8, is reversed with respect to the arrowheads shown, as will be explained below.

For use with my accessory in an emission mode, the optical path in the spectrometer is reversed compared with that when the spectrometer is used in its normal transmission mode. In the emission mode, my accessory is placed in the sampling chamber designated 18 and becomes the source of the IR radiation, which, as shown correctly by the arrowheads, reflects off of mirror 17, is passed through the interferometer 16 acting in the same manner as before, and continues along the path shown from mirrors 15 and 14 through iris 13 and after reflection from an ellipsoidal mirror 12 (added for the emission mode) becomes incident on the element designated 10, which is the detector optics, for example a standard TGS detector. In other words, the source normally present in 11 when the spectrometer is used in its normal transmission mode, is removed and replaced by the detector optics 10. Many commercial spectophotometers provide removable sources and detectors to allow analysis of a variety of materials for which particular wavelengths are especially suitable. In the case of the Mattson-Sirius 100, conversion from the transmission to the emission mode is even easier. This is accomplished very simply with the addition of a 6X ellipsoidal mirror, designated 12, which reflects the incoming radiation onto the detector 10. The original not-shown source does not have to be replaced or moved-just turned off. It is thus a simple task to convert the normal transmission spectrometer mode to the emission mode in accordance with my invention, and takes only a few minutes, including alignment.

The Mattson-Sirius instrument, being an FT-IR instrument, employs the interferometer designated 16. The resultant signal after detection which is in the spatial domain is then processed by a Fourier transformation into the frequency domain to produce the usual spectrum of signal intensity as a function of wavelength or wave number. In non-FT-IR instruments, the interferometer would be replaced with a monochromator acting as a wavelength disperser. In this case, the detected signal processing would mainly involve amplification and filtering to maximize the S/N.

In general, the emission spectrum can be measured in any instrument in which the emission accessory can be placed so that the beam modulator is between the accessory and the detector. This is usually the case in any null-balance double beam instrument. For the more sensitive FT-IR spectrometers, it is necessary either to replace the normal radiation source by the sample or to replace the source with the detector and then place the sample at the normal detector position or in the sampling compartment as is illustrated in FIG. 1.

The detector 10, in the usual way, converts the incident radiation into an electrical signal, which is then processed 6 in the usual way and used to drive an appropriate recorder 5 or other type of display device to produce a graph of signal intensity as a function of the beam wavelength to constitute the emission spectrum of the sample.

Figure 2:
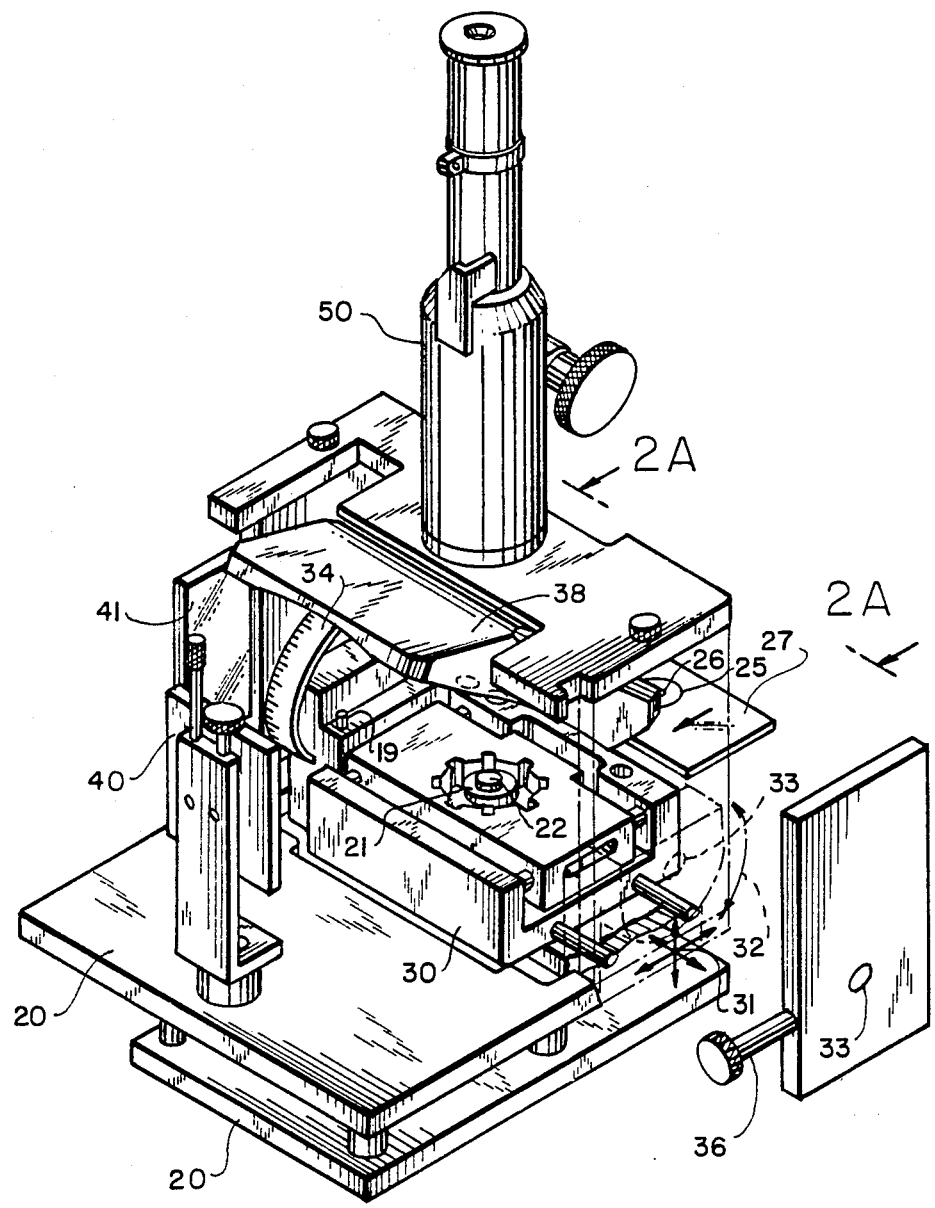
FIGS. 2 and 2A are perspective and rear views, respectively, of one form of the accessory of my invention.
Figure 2A:
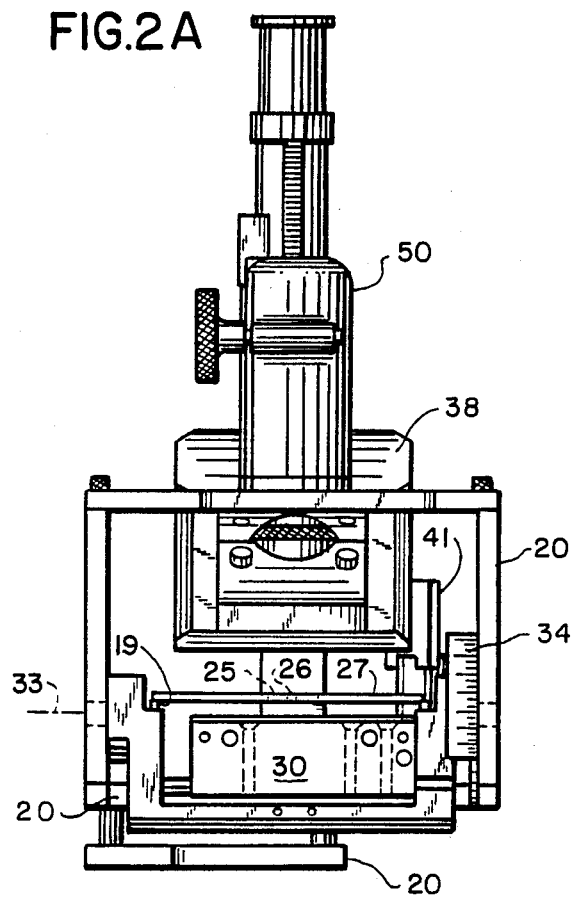
Figure 3:
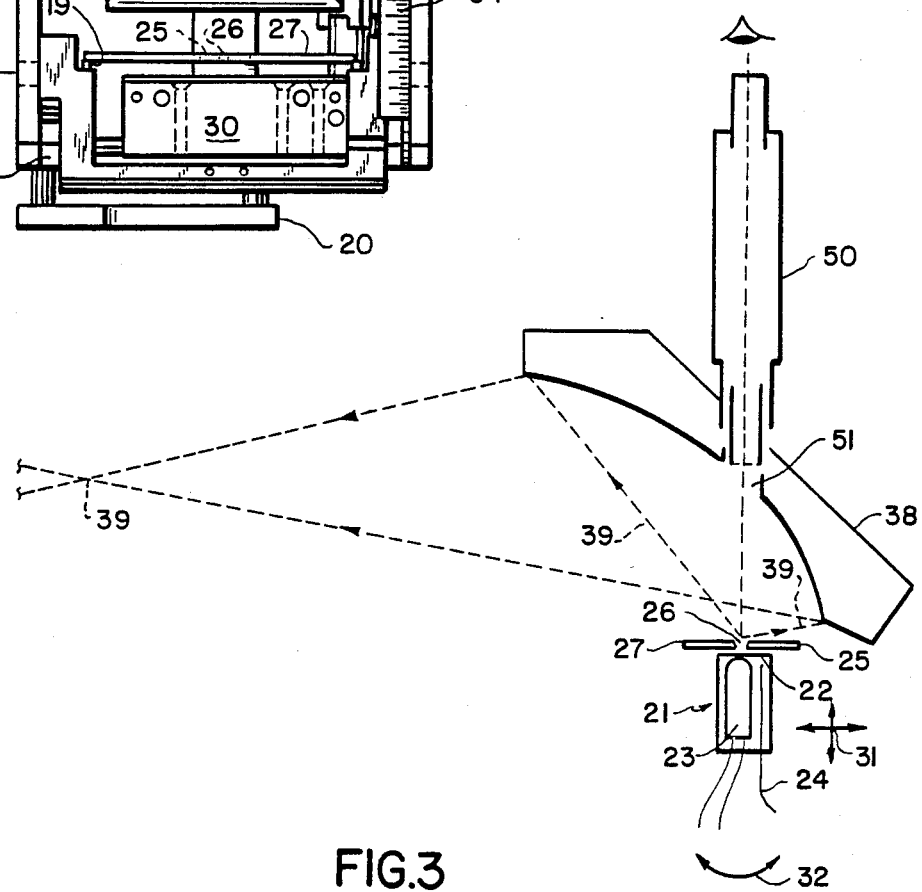
FIG. 3 is a schematic view of the accessory of FIG. 2 illustrating its optics.

FIGS. 2 and 2A are, respectively, perspective and rear views of my new accessory, and FIG. 3 shows the optics of the accessory. The accessory comprises an optical stand and base members 20 for the optical components. A sample support or holder 21 is provided. It comprises a highly reflective surface 22 on which the sample to be analyzed will be placed. Behind the highly reflective surface 22 and inside the holder 21 is provided a conventional heater 23 and a thermocouple 24 (shown in FIG. 3) to measure temperature. Above the sample surface, in the preferred embodiment, is a mask 25 with an aperture in the form of a pinhole 26. The mask 25, which also has a highly-reflecting top surface, is removably mounted to a supporting plate 27, also highly reflecting and removably mounted on the base 20 on pins 19. The sample holder 21 is mounted so as to be movable relative to the pinhole 26. Thus, different areas of the sample upon surface 22 can be made accessible via the pinhole 26. Any convenient mechanism can be provided to effect movement of the sample holder 21 in the plane of the sample upon surface 22. For example, in FIG. 2 movement is effected by conventional mechanisms mounted inside a support member 30 which allows movement of sample support 21 in the X-Y plane of its surface 22 relative to mask 25. In addition, the mechanism allows movement in the Z direction perpendicular to the X-Y plane. This is indicated in FIGS. 2 and 3 by arrows 31. Further, the support member 30 and overlying mask and support 25,27 are pivotable about an axis perpendicular to the plane of FIG. 3, indicated by arrows 32 allowing the sample surface and mask 25 to be tilted relative to a vertical line in FIG. 3 (the axis of tilt is designated 33 in FIG. 2), for reasons that will be explained later. The angle of tilt is indicated by a scale 34. Numeral 36 designates a locking screw mounted in a side support (shown exploded in FIG. 2) for maintaining the angle of tilt.

A large ellipsoidal mirror is shown at 38. It is mounted over the sample surface 22 so as to subtend a large solid angle and thus be able to collect as much as possible of the IR radiation emitted from the sample surface. An ellipsoidal surface is characterized by a short focal point and a long focal point. Radiation emitted in any direction from an object located at the short focal point and reflecting off of the ellipsoidal surface is focussed at its long focal point. In the embodiment illustrated in FIG. 3, the dashed lines 39 emanating outwardly from the mask aperture 26 represent all radiation emitted from the sample surface and collected by the ellipsoidal mirror 38. Thus, the mask aperture 26 is located at the short focus of the ellipsoidal mirror. After reflection from the mirror 38, the radiation is focussed at the mirror's long focus, designated 39.

The accessory is positioned in the spectrometer chamber 18 (FIG. 1) such that the long focus 39 occurs at a point in the normal spectrometer optics such that as the radiation propagates backward through the instrument as depicted by the arrows in FIG. 1, the long focal point is reimaged on the detector optics 10.

While the ellipsoidal reflector-collector 38 is preferred, it is also possible to substitute a paraboloidal surface where the accessory is to be used with a spectrophotometer having a collimated beam. The paraboloid reflector differs from the ellipsoid only in that all rays emitted from its focus and reflecting off of the paraboloid surface are parallel rather than refocussed as with the elliptical surface.

In using the accessory of my invention, since the IR emitting sample is placed at or adjacent to the short focus 26 of the ellipsoidal mirror's surface and the collected radiation is transferred to the long ellipsoidal mirror's focus 39 and then into the spectrometer, this approach significantly increases the S/N and allows one to measure the emission spectra from rough surfaces. In addition, it is easy to control the sample surface area from which the emission spectrum is taken. As shown in FIG. 3, the sample is placed on the highly reflecting top 22 of the heater cylinder 21 just under the mask hole 26. The mask hole 26 is positioned accurately at the short ellipsoid focus. In an accessory actually reduced to practice, the short focal distance was 42 mm, with an ellipsoidal mirror measuring roughly 6.4×7.6 cm.

The highly-reflecting surface 22 which receives the sample can be the round top of the hollow sleeve 21 which houses the heater element 23. Typical dimensions are a diameter of ⅜-½ inches—($\approx$10 mm) It is preferably of metal, such as polished aluminum or polished stainless steel. Metal is preferred for its thermal conductivity to maintain accurate temperature. In the preferred embodiment, the overlying mask 25 is provided. It too preferably has a highly-reflecting surface and is made of metal, such as polished aluminum or stainless steel. The mask 25 is removable. Thus, two convenient modes are provided for using the accessory. In the first mode, shown in FIG. 2, the mask 25 is removed. The sample is placed on the highly-reflecting surface 22 of the holder 21. This first mode is to be used with very small samples, occupying only a small fraction of the sample surface, so that the ellipsoidal mirror 38 sees only the IR emission from a sample surrounded by a reflecting surface 22. In the second mode, shown in FIG. 2A, where the sample covers a substantial part of the surface 22, the mask 25 is mounted in place on support 27 so that only a small area of the sample is accessible via the aperture 26. In both modes, the sample emission will be collected from a surrounding, highly-reflecting surface to reduce background emission. The highly-reflecting surfaces can be a polished surface of a metal substrate as described, or can be a deposited metal mirrored surface on a non-reflecting substrate. For example, the substrate can be of plastic or glass or sapphire or stainless steel coated with a highly-reflecting aluminum or gold layer. When the mask is used, the hole size can vary from about 10 microns to 1 mm. The solid angle subtended by the mirror 38 is about 20% of $4\pi$ or 145 degrees and preferably is at least about 5% of $4\pi$ degrees. While not illustrated in FIG. 3, but shown in FIG. 2, additional plane mirrors 40 and 41 can be provided to help redirect the radiation reflected off of ellipsoidal mirror 38 so as to coincide with the optical path of the instrument designated by the dashed lines in FIG. 1. The plane mirrors may be omitted or not used where the optical geometry of the instrument makes them unnecessary.

In the accessory of my invention, I also provide a conventional microscope 50 mounted on the support and fixed to the ellipsoidal mirror 38 at its center. A small hole (shown enlarged in FIG. 3) 51 is provided through the mirror 38 to allow the user to sight on the portion of the sample to be analyzed, which is done through the mask aperture 26. This allows the user to readily select which area, however small, of the sample is to be investigated.

In using the instrument, as is conventional, the sample is first replaced with a black body radiator (e.g., of graphite) and its spectrum measured at the same elevated temperature at which the sample will subsequently be measured. This data is recorded and used as a reference against which the sample radiation is later compared to provide a more accurate measurement. Typical sample temperatures range from 25-150 degrees C. The higher the temperature chosen, the greater is the detected signal and the S/N.

I have conducted a number of experiments with the apparatus of my invention in order to verify the results described herein, and many of these experimental results have been described in a scientific paper co-authored by me and published in Applied Spectroscopy, 40, 401-405 (1986). I will now briefly describe some of those experiments with reference to the spectra obtained which are depicted in various figures of my above paper, whose contents are hereby incorporated by reference, and which I will reference herein as AP-Fig (for example, AP-FIG. 1 means FIG. 1 of the App. Spect. paper). In the following discussion, in addition, I will reference from time to time by name the published works of others, which publications are also identified in my published paper.

The IR emission spectrum of a sample is generally similar to its transmission spectrum (in the case of thin films on metal, to transmission-reflection), but inverted, i.e., regions of high transmission are regions of low emission and vice-versa. It is a plot of emittance (ordinate) versus frequency (abscissa). Emittance at a particular frequency is defined by the ratio: radiant energy of the sample to radiant energy of a black body per unit area, when the sample and black body are at the same temperature. In AP-FIG. 2, the single beam spectra of a black body, recorded at different temperatures as a reference spectra, are shown. Conforming to Planck's Law, the shape of these spectra is temperature dependent. The most useful emission spectrum with the apparatus of my invention is obtained at temperatures at 25-150 degrees C. in the wavelength range of 500-1500 cm because this is the region where the black body radiation curve has its maximum emissivity. (Where the Emissivity is the proportionality constant, the emission from an ideal black body must be multiplied by T degrees to give the emission of the source.)

The best test which confirms that the emission measured is really coming from the heated samples is the dependance of emissivity on the sample temperature. In AP-FIG. 3, emission spectra of 3 $\mu$m thick coatings of magnesium silicate are shown, which were obtained with the sample maintained a different temperatures with the apparatus according to my invention. These spectra were not referred to black body spectra at the same temperatures, but only to one and the same black body spectrum in order to show the temperature effect. These spectra, even at room temperature, are of good quality and the noise is very low. Band intensity increases with temperature and the linearity o this increase (e.g., observed on the 865 1/cm band) with inverse temperature shows that the emission is really originating from the heated sample. In AP-FIG. 4, the emission spectra of AP-FIG. 3 were recalculated by the two temperature method of Chase. In this procedure, true emissivities are obtained from the spectra recorded for two different sample temperatures and the black body spectra recorded at the same temperatures. (This true emissivity is temperature independent.) This emission spectrum is almost identical with transmission reflection spectrum measured at near grazing angle that have been previously published. All observed bands are due to fosterite crystals which are the main component of the silicate coating; pure fosterite is only present in the outer layer of the silicate coating. The observation of Fosterite crystals strongly suggests that the emitted radiation comes mainly from the sample surface. Details of further supporting evidence is given in my paper.

According to Greeler, emission from molecules on a metal surface has a maximum intensity when the viewing angle is between 70 and 80 degrees from the normal. While some of my measurements don't support this view, I have nevertheless provided a mechanism as previously described to allow tilting of the sample surface to afford additional flexibility to the user to maximize signal intensity. This tilting is indicated by the arrowed curve 32.

As was previously mentioned, the sample with heater can be moved relative to the mask hole; therefore the emission spectra can be recorded for different sample areas. This possibility is illustrated in AP-FIG. 6 in which both spectra were taken from different places on the same sample. The distance between both areas was about 5 mm, but can be reduced with a smaller mask hole to about 0.5 mm. That both spectra are different can be due to the chemical inhomogeniety of the coating and/or to the different coating thickness which changes the component intensities. This idea, which can be called Scanning Emission Infrared Spectroscopy, seems very attractive for surface studies and further study will indicate its possible applications. Emission IR spectoscopy can also be extended to non-flat or rough metal surfaces and non-metal materials surface studies as well. An example of such an application is illustrated in AP-FIG. 7 where the emission spectra of silica gel grains are shown. For emission spectroscopy of thick samples, a problem encountered is reabsorption of radiation from inner, warmer sample parts by the outer, cooler sample parts, which is illustrated in AP-FIG. 8.

FIG. 4 of the drawings of the application illustrates some of the excellent results obtained with my invention. In this figure are depicted the spectra of KBr, measured in three different ways. Curve (60) is the emission spectrum taken with the emission mode accessory of my invention, curve (61) was taken with a diffuse reflection technique and curve (62) by transmission. Only in the case of the emission spectrum can one easily recognize bands due to KBr impurities in the range of 900–1250 l/cm which are due to sulfate and phosphate ions. There is no evidence of such impurities in the transmission spectrum.

The IR emission collecting accessory of my invention has several advantages which can extend the possibilities for application of emission IR spectroscopy. These are:

1. Collection of a sample's emitted IR radiation over very large solid angles improves the S/N significantly, and makes possible emission spectra measurements from non flat and rough sample surfaces.

2. Only a small sample area is necessary for emission spectra measurements because the sample is positioned in a collecting, ellipsoidal mirror focus.

3. A mask with different hole sizes placed just over the sample in combination with the microscope in the mirror center allows one to control the sample area from which the emission spectrum is recorded.

4. A movable sample holder and a mask hole fixed in focus position allows measurement of spectra from different places on the sample.

5. The sample and mask can be tilted over a broad angle range which may improve the signal intensity for a very thin film on a flat metal surface.

While my invention has been described in connection with a preferred embodiment, this is not meant to be limiting and variations and modifications thereof as would be evident to one skilled in this art are deemed to be within the scope of the appended claims.

What is claimed is:

1. An accessory for infrared emission spectroscopy comprising:
   a. a base member;
   b. a member having a sample-supporting surface portion mounted on the base member;
   c. a masking member mounted closely adjacent and over the sample-supporting surface portion and having a highly-reflecting upper surface and a small aperture therein;
   d. a curved first mirror subtending a large solid angle and having a first focus and mounted on the base member;
   e. said masking member being mounted so as to extend completely between the curved first mirror and the sample-supporting surface portion and such that the first focus of the first mirror is located substantially at the said aperture.

2. An accessory as claimed in claim 1, wherein the sample-supporting surface portion is flat, and the masking member is flat and the aperture in the latter is much smaller than the sample-supporting surface portion.

3. An accessory as claimed in claim 1 further comprising means for moving the sample-supporting surface portion relative to the said aperture in two directions in the plane of the sample-supporting surface portion such that different areas of the sample can be selectively analyzed.

4. An accessory as claimed in claim 1 wherein the masking member is replaceable.

5. An accessory as claimed in claim 1 further comprising a microscope mounted to enable a user to view the sample-supporting surface portion through the aperture and through said mirror.

6. An accessory as claimed in claim 5 wherein the microscope is mounted adjacent and at the center of the top of the first mirror.

7. An accessory as claimed in claim 5 further comprising means for moving the sample-supporting surface portion relative to the said aperture along three coordinate axes.

8. An accessory as claimed in claim 7 further comprising means for tilting the sample-supporting surface portion together with the masking member relative to the first mirror.

9. An accessory as claimed in claim 1 further comprising means for heating the sample-supporting surface portion.

10. An accessory as claimed in claim 9 further comprising means for moving the sample-supporting surface portion relative to the first mirror.

11. An accessory as claimed in claim 9 wherein the first mirror has an ellipsoidal surface with a second focus, the second focus being substantially further from the mirror than the first focus.

12. An accessory as claimed in claim 9, wherein the first mirror has a paraboloid surface.

13. An accessory as claimed in claim 1 wherein the masking member comprises polished metal, and the sample-supporting surface comprises polished metal.

14. An IR emission spectrometer comprising a sample chamber, a wavelength analyzer and an IR detector, said accessory as claimed in claim 1 being positioned in the sample chamber such that IR emission from a sample located on the sample-supporting surface portion will pass through the wavelength analyzer and become incident on the detector, and means connected to the detector for displaying the intensity of the IR emission as a function of wavelength.

15. A spectrometer as claimed in claim 14 and further comprising means for maintaining the sample at an elevated temperature.

* * * * *